Jan. 2, 1968  A. HEIM  3,360,920
PENDULUM CLOCK WITH SPEED REGULATING BALANCED PENDULUM
Filed Jan. 11, 1966  2 Sheets-Sheet 2

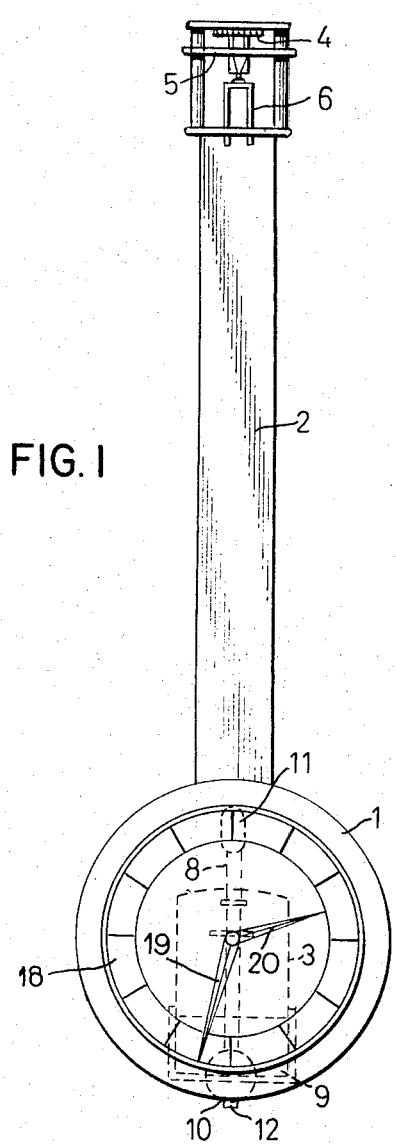
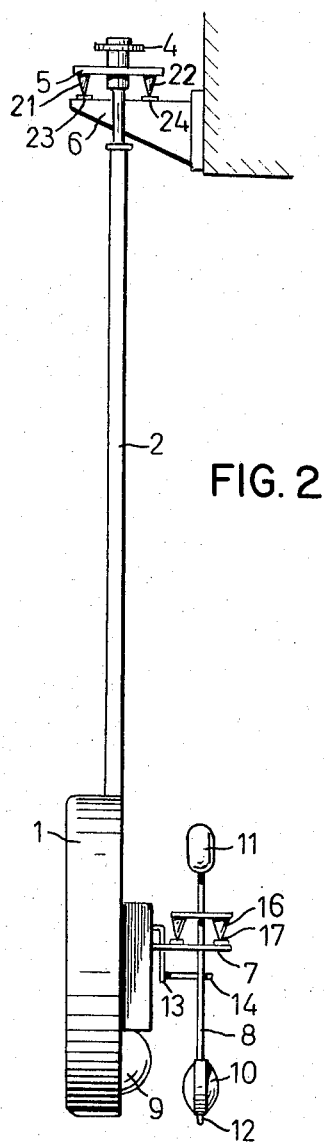

INVENTOR.
ALFRED HEIM, DECEASED,
BY HEINRICH GISSLER,
ACTING AS A SURROGATE'S COURT
By

United States Patent Office 3,360,920
Patented Jan. 2, 1968

3,360,920
PENDULUM CLOCK WITH SPEED REGULATING BALANCED PENDULUM
Alfred Heim, deceased, late of Triberg, Germany, by Heinrich Gissler, legal representative, Triberg, Black Forest, Germany, assignor to Jahresuhren-Fabrik G.m.b.H. Aug. Schatz & Sohne, Triberg, Black Forest, Germany, a limited company of Germany
Filed Jan. 11, 1966, Ser. No. 519,978
Claims priority, application Germany, Jan. 14, 1965, J 27,331
7 Claims. (Cl. 58—2)

ABSTRACT OF THE DISCLOSURE

In a pendulum clock, a rod carries a bob in and on which are provided the clockwork mechanism, the dial, and the hands. Rearwardly of the bob and mounted on the clockwork, there is a speed-regulating means which includes a pendulum balanced by a counterweight.

---

Figure 3:
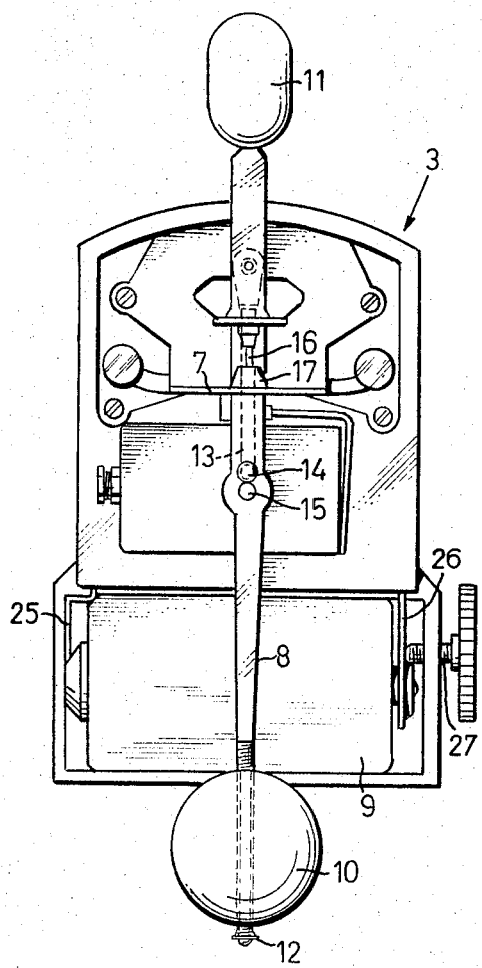

The invention relates to pendulum clocks and particularly to a pendulum clock equipped with a speed-regulating pendulum balanced by a counterweight.

It is known to provide clocks with a counterweight-balanced pendulum. It is an advantage of the known clocks of this type that the frequency of oscillation can be adjusted over a wide range by suitable distribution of the pendulum weight relative to its axis, and that only a small amount of power is necessary for maintaining oscillation of the pendulum when the same is closely balanced. This feature is particularly valuable in battery-energized, electrically operated clocks in which the power requirement of the clockwork mechanism is inversely related to the useful life of the battery.

It is also known to install the clockwork mechanism of a pendulum clock, its dial, and its hands in the bob of the pendulum which is arranged to swing freely. The pendulum is suspended on a stationary support such as a housing, or directly on a building wall. Oscillation of the pendulum is maintained by engagement of a pendulum guide actuated by the clockwork mechanism with a stationary element, such as a pin fixedly mounted on the clock housing or the wall which engages an elongated slot in the pendulum guide.

The pendulum drive of the last described device does not operate properly unless the pin which engages the pendulum guide is precisely aligned in a vertical direction with the axis of the pendulum. It is therefore very difficult for anybody but an expert clockmaker to install such a clock and to adjust it for proper operation. The known clock, moreover, has additional adjusting elements which must be set properly if the clock is to give satisfactory service, and a relatively strong power source is required for overcoming the friction losses which are unavoidable in such a clock.

The primary object of the invention is the provision of a pendulum clock which can readily be installed by a layman in a satisfactory manner.

Another object is the provision of a pendulum clock which has very low power requirements, and is therefore particularly suitable for electrical operation by means of a battery.

With these and other objects in view, the pendulum clock of the invention has a free swinging pendulum which bob includes the clockwork mechanism and a counterweight-balanced pendulum. The free swinging pendulum is driven by the counterweight-balanced pendulum which leads the free swinging pendulum by a fraction of an oscillation.

The difference in the cycles of movement between the two pendulums is achieved in a simple manner by suitably adjusting the natural frequencies of the free swinging pendulum and of the balanced pendulum. The frequency of oscillation of the balanced pendulum is preferably chosen slightly higher than that of the free swinging pendulum, means being provided for separately adjusting the effective length of each pendulum, and for securing the adjusted length.

It is an important advantage of the clock of the invention that the speed regulation system employed requires very little power so that the clock work mechanism may be energized by a battery in a conventional manner, but the useful life of the battery is much longer than with known comparable clocks. When the battery is replaced or removed for charging and returned to its position, the clock is immediately ready for operation, and does not require adjustment. It can be installed by a layman without difficulty.

Figure 4:
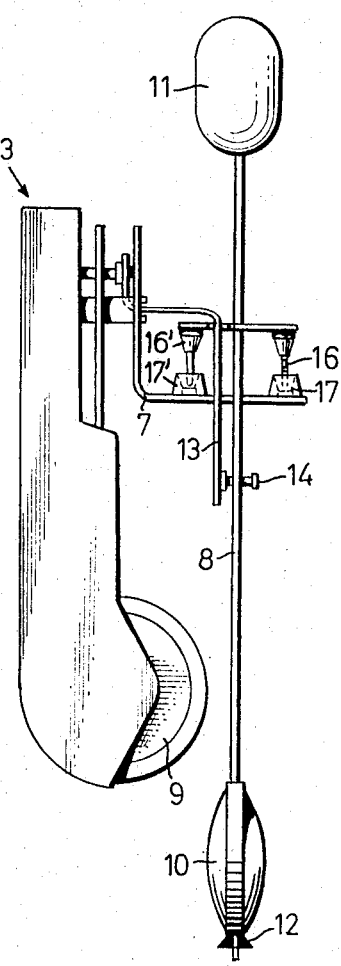

Other features, additional objects, and many of the attendant advantages of this invention will be readily appreciated as the same becomes better understood by reference to the following detailed description of a preferred embodiment when considered in connection with the accompanying drawing in which:

FIG. 1 shows a pendulum clock of the invention in front elevation;
FIG. 2 illustrates the clock of FIG. 1 in side elevation;
FIG. 3 is a rear view of the clockwork assembly of the pendulum clock on a larger scale; and
FIG. 4 shows the assembly of FIG. 3 in side elevation.

Referring initially to FIG. 1 there is seen a free-swinging pendulum whose rod 2 carries a substantially cylindrical knob housing 1. The dial 18 and hands 19, 20 of the clock are mounted on the circular front face of the housing 1. A conventional clockwork mechanism 3 which is wound periodically by an electric actuator energized by a flash-light battery 9 is installed in the rearwardly open housing 1.

The top end of the rod 2 is suspended from a bridge member 5 and is vertically adjustable relative to the member 5 by an adjustment screw 4 in the usual manner for varying the effective length of the free-swinging pendulum. Two downwardly pointed pins 21, 22 on the member 5 are supported on respective horizontally spaced bearings 23, 24 on a bracket 6 which is attached to a stationary support, not shown in detail.

As is better seen in FIG. 2, a bracket 7 projecting rearwardly from the casing of the clockwork mechanism 3 supports a balanced pendulum whose rod 8 has pins 16, 16' fastened thereto. The pins 16, 16' are downwardly pointed and rest on respective bearings 17, 17' spaced from each other in the same direction as the bearings 23, 24. The rod 8 projects upward and downward from its axis of oscillations through the points of the pins 16, 16'. Its upper end carires a fixed counterweight 11, and its lower end a bob or ball 10.

As is better seen in FIGS. 3 and 4 which show the clockwork mechanism and associated elements after removal from the bob housing 1, the lower end of the rod 8 is threaded and passes through a bore of the ball 10. The longitudinal position of the ball on the rod 8 may thus be adjusted, and the ball may be secured in the adjusted position by a knurled nut 12. A crank-shaped pendulum guide 13, whose oscillations about a horizontal axis are energized by the non-illustrated escapement of the clockwork mechanism and regulate the speed of the mechanism in a conventional manner not illustrated in detail, carries a pin 14 on its free end. The pin engages a longitudinally elongated slot 15 in the rod 8.

The clockwork mechanism 3 is energized by the battery 9 which is secured between contact blades 25, 26 by a screw 27 whose knurled head is readily accessible for changing the battery. The blades 25, 26 are elements of the electrically operated winding arrangement, not otherwise shown, for the clockwork mechanism 3.

The illustrated clock is started by manually initiating swinging movement of the pendulum rod 2 on the pins 21, 22. The oscillations of the free swinging pendulum are maintained by setting the balanced pendulum by the nut 12 for a frequency of one to two oscillations per minute more than the frequency of the free swinging pendulum. The balanced pendulum thus leads the free swinging pendulum from each reversal point until it passes its lowermost position, whereby the free swinging pendulum is given a direct impulse which compensates for friction losses. This driving impulse is transmitted from the balanced pendulum to the free-swinging pendulum until the frequency of oscillations of the former automatically adjusts itself to that of the latter.

The pendulum clock is thereby kept running without additional friction losses during transmission of driving power to the free swinging pendulum 1, 2. The power required for actuating the free swinging pendulum is supplied by the battery 9 since the balanced pendulum 8, 10, 11 is being energized by the clockwork mechanism 3. The force required, however, is very small, and the useful life of the battery 9 is very long.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the appended claims.

What is claimed is:
1. A clock comprising in combination:
 (a) a pendulum bob; and
 (b) rod means for suspending said pendulum bob for oscillating pendulum movement about an axis spaced from said bob, said bob including
  (1) a clockwork mechanism and
  (2) speed regulating means for regulating the speed of said mechanism, the speed regulating means including a balanced pendulum.
2. A clock as set forth in claim 1, wherein said balanced pendulum is mounted on said clockwork mechanism for movement about an axis parallel to the axis of oscillating movement of the pendulum bob.
3. A clock as set forth in claim 2, wherein said clockwork mechanism includes winding means operated by an electric battery.
4. A clock as set forth in claim 1, further comprising adjusting means for varying the spacing of said bob from said axis of oscillating pendulum movement thereof, and means for varying the effective length of said balanced pendulum.
5. A clock as set forth in claim 2, wherein said clockwork mechanism includes a dial, hands movable on said dial, and said speed regulating means include motion transmitting means interposed between said balanced pendulum and said hands for regulating the movement of the hands of said dial in response to the oscillation of said balanced pendulum.
6. A clock as set forth in claim 1, wherein said balanced pendulum includes a rod member secured to said clockwork mechanism for movement about another axis parallel to the axis of oscillating movement of said pendulum bob, ball means on said rod and spaced from said other axis in one direction, and a counterweight on said rod and spaced from said other axis in a direction opposite to said other direction.
7. A clock as set forth in claim 1, further comprising a support, and bearing means interposed between said support and said rod means and defining said axis of oscillating pendulum movement.

No references cited.

RICHARD B. WILKINSON, *Primary Examiner.*

MICHAEL LORCH, STANLEY A. WAL,
*Assistant Examiners.*